United States Patent
Fehler

[15] 3,664,124
[45] May 23, 1972

[54] GAS TURBINE ENGINE

[72] Inventor: Adolf Fehler, Puchheim, Germany

[73] Assignee: Motoren-und Turbinen-Union Muchen GmbH, Postfach, Munchen, Germany

[22] Filed: Apr. 17, 1970

[21] Appl. No.: 29,479

[30] Foreign Application Priority Data

Apr. 17, 1969 Germany..................P 19 19 488.8

[52] U.S. Cl...........................................60/39.28, 60/39.74
[51] Int. Cl. ......................................................F02c 9/08
[58] Field of Search ................60/39.81, 39.79, 39.8, 39.74, 60/39.06, 39.14

[56] References Cited

UNITED STATES PATENTS

| | | | |
|---|---|---|---|
| 1,363,470 | 12/1920 | Knudsen | 60/39.74 UX |
| 2,884,009 | 4/1959 | Hetherington | 60/39.74 UX |
| 2,855,941 | 10/1958 | Oberle | 415/10 |
| 2,430,264 | 11/1947 | Wiegand | 60/39.74 UX |
| 2,613,998 | 10/1952 | Noon | 60/39.74 |
| 2,884,758 | 5/1959 | Oberle | 60/39.74 X |

FOREIGN PATENTS OR APPLICATIONS 618,486   2/1949   Great Britain........................60/39.74

Primary Examiner—Clarence R. Gordon
Attorney—Craig, Antonelli and Hill

[57] ABSTRACT

A gas turbine engine with a compressor, a combustion chamber and a turbine, in which the fuel metering device, controlling metering slots, is combined with the injection installation so as to form an integral component thereof, for example, within a common housing.

27 Claims, 6 Drawing Figures

GAS TURBINE ENGINE

The present invention relates to a gas turbine engine which comprises at least one compressor, one combustion chamber as well as at least one turbine, and which is additionally equipped with at least one fuel injection mechanism, and which further includes devices metering the fuel quantity to be fed to the injection mechanism as well as devices for maintaining a constant fuel pressure upstream of the variable fuel metering slots of the injection nozzle.

In order to assure with an optimum fuel feed or distribution to one or several fuel injection nozzles associated with the combustion chamber or chambers, respectively, for every operating range, one has utilized heretofore a plurality of pneumatically, hydraulically or mechanically actuated adjusting elements in control systems, or it was heretofore necessary to mutually couple or interlink a great number of such actuating elements.

Such known control systems for gas turbine engines, consisting of a large number of actuating elements, entail the disadvantages of high production expenditures, a susceptibility to failures which can hardly be eliminated and thus causes inaccuracy, as well as the drawbacks with respect to mechanical friction losses necessitating a relatively large actuating energy.

Furthermore, the manufacture of such known control installations involves relatively high costs.

The objects of the present invention therefore are to provide a control system metering the fuel quantity for gas turbine engines, which eliminates the disadvantages of the prior art and previously mentioned control systems, i.e., is to get along with a relative small number of actuating elements, is to keep the manufacturing costs reasonably low, and is to involve a design and construction that is compact and insusceptible to failures and furthermore is to assure an optimum fuel feed or distribution adapted to the respective operating condition of the gas turbine.

In order to meet these requirements and to solve the underlying problems, the present invention primarily proposes for an engine of the type described above, that an installation for metering the fuel quantity is at the same time an integral part of the fuel injection mechanism.

Furthermore, the present invention proposes in connection with a fuel injection mechanism of a gas turbine engine of the type described above, which includes an axially displaceable control piston, one end face of which controls fuel metering slots tangentially arranged in an associated cylindrical atomizer head, that a common housing be provided, the first section of which houses essentially the control piston and the atomizer head, while the fuel metering device for metering the fuel quantity, which is connected either detachably or non-detachably directly with the control piston, is arranged in the second section. Thus, all major elements which ensure the proper fuel feed or distribution to the injection nozzle, are combined in a self-contained, compact housing.

The proposed separable connection between the control piston or spool valve and the fuel metering device further contributes to a facilitated assembly and maintenance of the injection mechanism.

The maintenance and assembly of a fuel injection mechanism associated with a gas turbine engine can be further facilitated according to the present invention in that the second housing section is readily detachably connected to the first housing section.

According to the present invention, the fuel metering device can be constructed as a pneumatically, hydraulically, electrically or mechanically actuated diaphragm.

According to a further embodiment of the present invention, the fuel metering device can also be constructed—instead of being constructed as diaphragm — as a pneumatically, hydraulically or mechanically adjustable spool valve or control piston adjustable against the reset effect of a spring.

The present invention further proposes the application of an electric actuating motor which is operable to actuate the fuel metering device.

Furthermore, according to the present invention, a device actuated as a function of engine r.p.m. may be provided which opens or closes a bleed valve connected with the fuel metering device. This device may become operative upon exceeding a predetermined, intended engine rotational speed value and may, for example, in case of a pneumatically actuated fuel metering device, effect an air pressure reduction within the associated cylindrical chamber of this device, thereby causing the adjusting element of the fuel metering device constructed, for example, as a diaphragm, to reduce the fuel feed cross-sections or metering areas of the nozzle with the aid of the control piston of the injection installation, which has as a consequence a desired speed reduction of the engine.

These and further objects, features and advantages of the present invention will become more obvious from the following description when taken in conjunction with the accompanying drawing which shows, for purposes of illustration only, several embodiments in accordance with the present invention and wherein:

FIG. 2 is a longitudinal axial cross-sectional view of a first embodiment of a fuel injection mechanism combined with a fuel metering installation in accordance with the present invention;

FIG. 3 is a longitudinal axial cross-sectional view of a second embodiment of a fuel injection mechanism combined with a fuel metering installation in accordance with the present invention;

Figure 1:
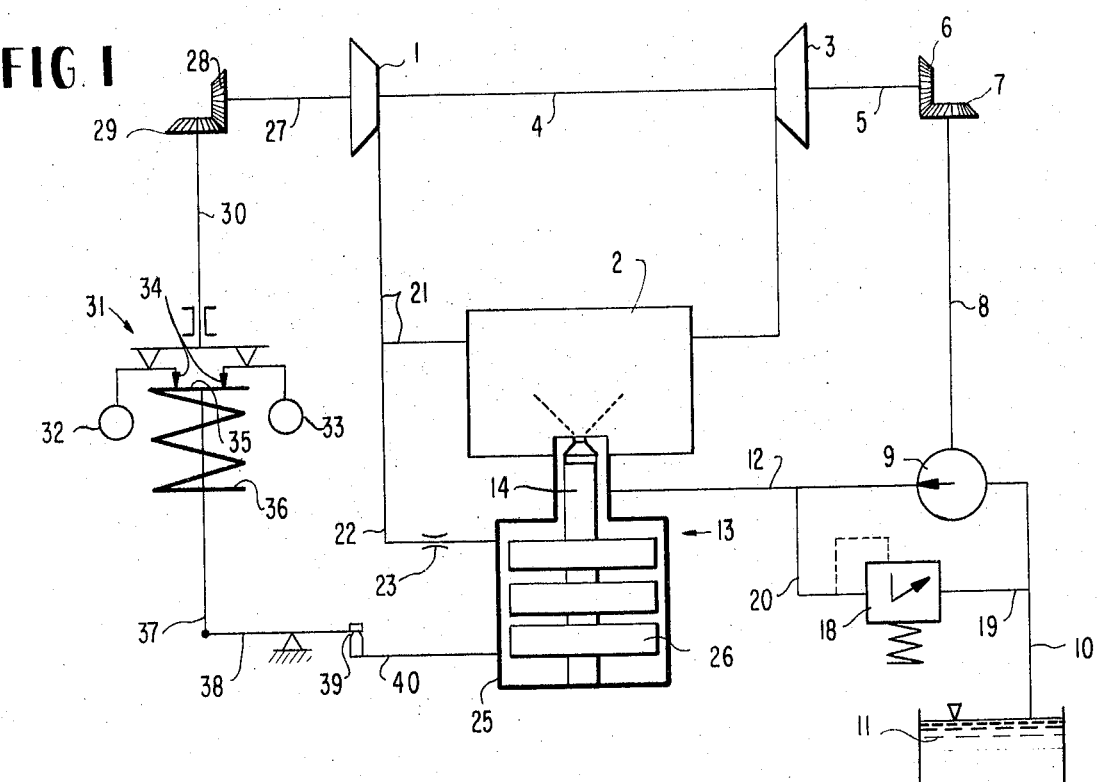
FIG. 1 is a schematic view of a gas turbine power plant with an associated first control system in accordance with the present invention.

Referring now to the drawing wherein like reference numerals are used throughout the various views to designate like parts, and more particularly to FIG. 1, the gas turbine engine schematically illustrated in this figure essentially consists of a compressor 1, of a combustion chamber 2, arranged downstream of the compressor 1 and of a compressor-turbine 3, arranged downstream of the combustion chamber 2, which is connected with the compressor 1 by way of a shaft 4. A shaft 5 is branched-off from compressor-turbine 3, which includes a bevel-type gear 6. This bevel-type gear 6 engages with a corresponding bevel-type gear 7 of a shaft 8 which is connected with a fuel pump 9, thus driving the pump. The fuel pump 9 draws-in fuel from a tank 11 by way of a line 10 and feeds this fuel by way of a line 12 to a fuel injection installation generally designated by reference numeral 13.

Such a fuel injection mechanism 13 will be described more fully hereinafter, for example, by reference to FIG. 2, and includes, inter alia, variable fuel metering slots 15 which are controlled by a spool valve or control piston 14 and through which the fuel reaches the nozzle orifice 17 by way of a swirl chamber 16.

In order to maintain constant the fuel pressure upstream of the metering slots 15, a differential pressure regulating valve 18 (FIG. 1) together with its lines 19 and 20 is connected between the lines 10 and 12.

A line 22 is branched-off from line 21 (FIG. 1) connecting the compressor 1 with the combustion chamber 20. Pressurized air, taken from the outlet of compressor 1, is supplied to the chamber 24 of housing section 25 through line 22 by way of a variable restrictor or throttle 23, whereupon a diaphragm 26 (FIG. 2) arranged on the inside of the housing section 25 and serving as a fuel metering device, is displaced towards the right, as viewed in FIG. 2, and simultaneously therewith the control piston or spool valve 14 connected with the diaphragm 26, opens the fuel metering slots and adjusts the same to a certain fuel metering area or flow cross-section.

As can be further seen from FIG. 1, a shaft 27 is branched off from the compressor 1, which drives a shaft 30 by way of bevel-type gears 28 and 29. The shaft 30 is operatively connected with a conventional centrifugal/speed governor generally designated by reference numeral 31 which responds as soon as a predetermined nominal, predetermined engine r.p.m. value is exceeded, in that the associated centrifugal pendula 32 and 33 displaced outwardly press a stop or abutment 35 downwards in the direction of the arrows 34. The stop 35 thereby acts upon a reset spring 36 which is coupled to a linkage 37, 38. Due to the downward movement of the lever 37, the lever 38 opens a bleed valve 39, which is in communication with chamber 24 of the housing section 25 by way of a line 40. Thus, the air pressure prevailing in the chamber 24 is reduced, whereupon the diaphragm 26 adjusts by way of control piston 14 the fuel metering slots 15 (FIG. 2) to a reduced fuel quantity.

The fuel injection mechanism 13, shown on an enlarged scale and in greater detail in FIG. 2, essentially consists of a small diameter housing section 41 and of a large diameter housing section 25. The control piston 14 is axially movably supported within the housing section 41, i.e., one end within the atomizer head 42 which contains the fuel metering slots 15, the swirl chamber 16 and the nozzle orifice 17, and which is assembled from the left to the end face of the housing section 41 and is secured to the housing section 41 by means of a threaded cap or bush 42'. The threaded cap 42' is constructed in the left part thereof in the shape of a fuel injection cone 43.

The other end of the control piston 14 is supported in a central bore 44 of a housing wall 45 which separates from each other the chambers 46 and 24 associated with housing sections 41 and 25. The fuel to be supplied to fuel injection mechanism 13, coming from the line 12, reaches the chamber 46 of housing section 41 by way of bores 47 and 48, and flows from there through fuel metering slots 15 to the nozzle orifice 17. The diaphragm 26 operable as fuel metering device may be manufactured from an elastic material, for example, of rubber. If so desired, the diaphragm 26 may be separably or detachably connected with the spool valve or control piston 14 by means of a journal or pin 49; the right end 50 of the diaphragm 26 is secured in a cover 41 sealing the housing section 25. The housing section 25 represents essentially a cylinder which, by means of threads 52, is screwed into a collar 53 belonging to the casing section 41. Reference numeral 54 designates an inlet bore for the compressor discharge air, supplied by way of line 22; reference numeral 55 designates another bore serving as pressure relief hole for the chamber 24 of the housing section 25, which is connected with the bleed valve 39 (FIG. 1) by way of line 40.

FIG. 3 differs primarily from the embodiment of FIG. 2 in that, instead of the diaphragm 26 (FIG. 2) acting as metering device, a piston 58 axially movable against the effect of a reset spring 57 is provided which is directly connected with the control piston or spool valve 14, the operation of which is identical to that shown in FIGS. 1 and 2, in connection with the control system according to FIG. 1.

Line 22 in FIG. 3 conducts again bleed air from the outlet of compressor 1 (FIG. 1) by way of a bore 59 into the chamber 60 of the housing section 56, and more particularly onto the side of the piston 58 opposite the spring 57, whereby the piston 58 is displaced against the force of the spring 57 and thus causes the control piston 14 to open the fuel metering slots 15 and to adjust the latter to a correct, predetermined fuel metering area. Line 40 is connected at bore 61 with the chamber 60 on the side of piston 58 opposite the spring 57 and connects the chamber 60 with the bleed valve 39 by way of line 40 (FIG. 1).

The control diagram illustrated by reference to FIG. 4, again schematically illustrates a gas turbine engine, comprising a compressor 30', a combustion chamber 32' arranged downstream of the compressor and connected with the compressor by a line 31', as well as a compressor-turbine 34' arranged downstream of the combustion chamber 32' and connected with the same by a line 33'; the compressor-turbine 34' is connected with the compressor 30' by way of a common shaft 35'. From the compressor-turbine 34', a shaft 36' is branched off, which drives a shaft 38' and therewith a fuel pump 39' by way of a transmission 37' including bevel-type gears. The fuel pump 39' draws-in fuel from tank 41' by way of line 40' and supplies this fuel to fuel injection mechanism generally designated by reference numeral 44' by way of lines 42' and 43'. A differential pressure regulating valve 47' is interconnected by means of lines 45' and 46' between lines 42', 43' and 40', the purpose of which is to maintain constant the fuel pressure upstream of the fuel metering slots (not shown in detail in this figure) of the fuel injection mechanism 44'.

Figure 4:
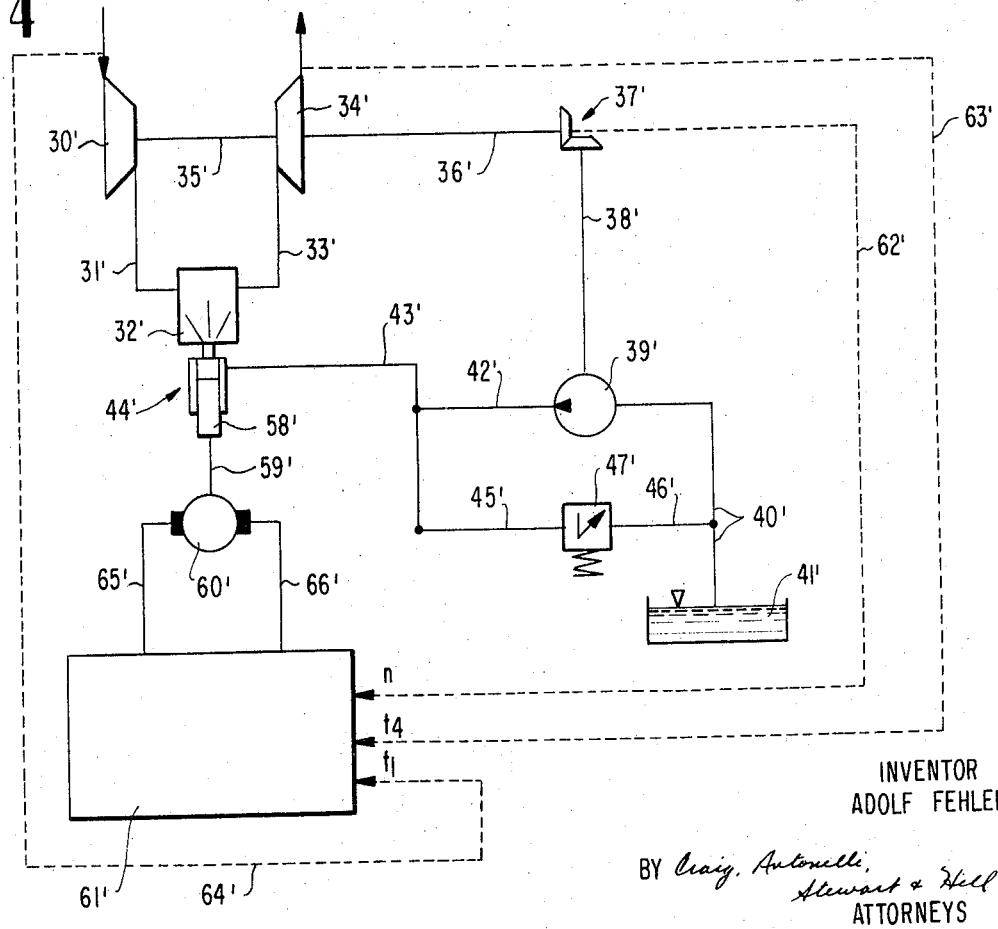
FIG. 4 is a schematic view of a gas turbine power plant with an associated second control system in accordance with the present invention.

As to the operation of the embodiment shown in FIG. 4, it is assumed that the fuel injection mechanism 44' is basically identical to that shown in FIG. 3. The basic difference of the fuel injection mechanism 44' (FIG. 4) compared to that shown in FIG. 3 is that the control piston or spool valve 58' acting as fuel metering device, is mechanically adjusted and more particularly from an electric motor 60' by way of a linkage 59'.

Furthermore, a conventional electric or electronic control installation 61' is provided which compares and/or amplifies operating magnitudes, such as $n$ (engine speed), $t_4$ (turbine exhaust gas temperature) and $t_1$ (compressor inlet temperature), which are converted by conventional means into electric signals and are transmitted from the gas turbine engine by way of electric lines 62', 63', 64'. The electric adjusting motor 60' is actuated by way of lines 65', 66' in dependence on the output signals of the electric or electronic control installation 61' and brings about by an adjustment of the control piston or spool valve 58' by way of the linkage 59' a control of the fuel metering slots 15 (FIG. 3) of the fuel injection mechanism 44' (FIG. 4) in dependence on the variation of operating magnitudes $n$, $t_4$ and $t_1$. Since such electric or electronic control devices 61', including their conventional logic elements, are known as such in the prior art and form no part of the present invention, a detailed description thereof is dispensed with herein.

Figure 5:
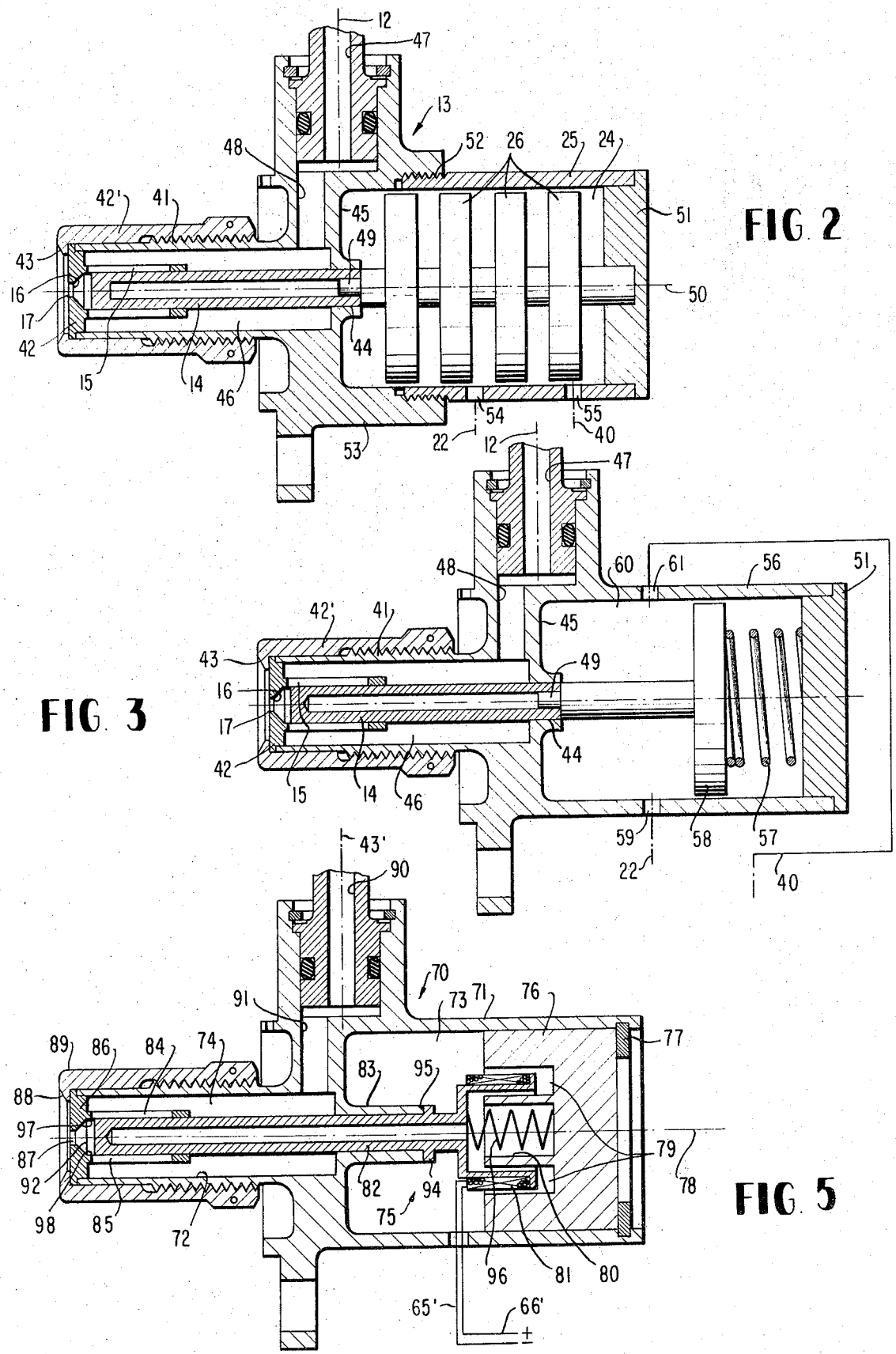
FIG. 5 is a longitudinal, axial, cross-sectional view of a third embodiment of a fuel injection mechanism combined with a fuel metering installation in accordance with the present invention.

FIG. 5 illustrates an electro-magnetically actuated fuel injection mechanism generally designated by reference numeral 70 which is simultaneously constructed as fuel metering device and essentially consists of a large-diameter cylindrical housing section 71 and of a further, small-diameter cylindrical housing section 72. The cylindrical housing sections 71 and 72 form chambers 73 and 74 separated from each other. The fuel metering installation generally designated by reference numeral 75 and having a magnet core 76 filling approximately half of the chamber 73 is located within this chamber 73; the magnet core 76 is secured within the chamber 73 by means of a circular stop 77.

The magnet core 76 is additionally provided with an annular groove 79, extending coaxially to the longitudinal axis 78 of the fuel injection mechanism 70 and acting as a magnet armature, and with a bore 80 in the center of and surrounded by this annular groove 79. The fuel metering device 75 equipped with a magnet coil 81 at its right end protrudes into the annular groove 79 and includes a cylindrical, hollow spool valve or control piston 82. The control piston 82 is axially movably supported in chamber 73 within a sleeve 83, forming a part of housing section 71, and within an atomizer head 86, having fuel metering slots 84 and 85. The atomizer head 86 contains also the nozzle orifice 87 and is mounted from the left over the outer end of housing section 72 of the fuel injection mechanism 70. A further threaded cap or bush 89, having a fuel injection cone 88 is screwed over housing section 72 from the left, thereby simultaneously locating and securing the atomizer head 86 on the housing section 72.

From the fuel supply system of a gas turbine engine (FIG. 4), fuel is conducted from fuel pump 39' by way of lines 42' and 43' and by way of bores 90 and 91 into the chamber 74 of the fuel injection installation 70; from there, the fuel is conducted by way of fuel metering slots 84 and 85 into a swirl chamber 92 and finally, by way of nozzle orifice 87 into the combustion chamber 2 (FIG. 1).

Instead of the electric actuating motor 60', provided in FIG. 4, the solenoid coil 81 (FIG. 5) is energized by way of electrical lines 65' and 66' which may be operatively connected with a conventional electric or electronic control device 61' (FIG. 4), by means of current pulses produced by this control device 61'; with a desired maximum fuel flow, the solenoid coil 81 may enter into the annular groove 79 over its entire length, thereby causing the control piston or spool valve 82 to disengage its collar 94 from the inward end 95 of the sleeve 83, serving as stop for the control piston or spool valve 82, against the effect of the reset spring 96 located within the aperture 80 of the magnet core 76.

Figure 6:
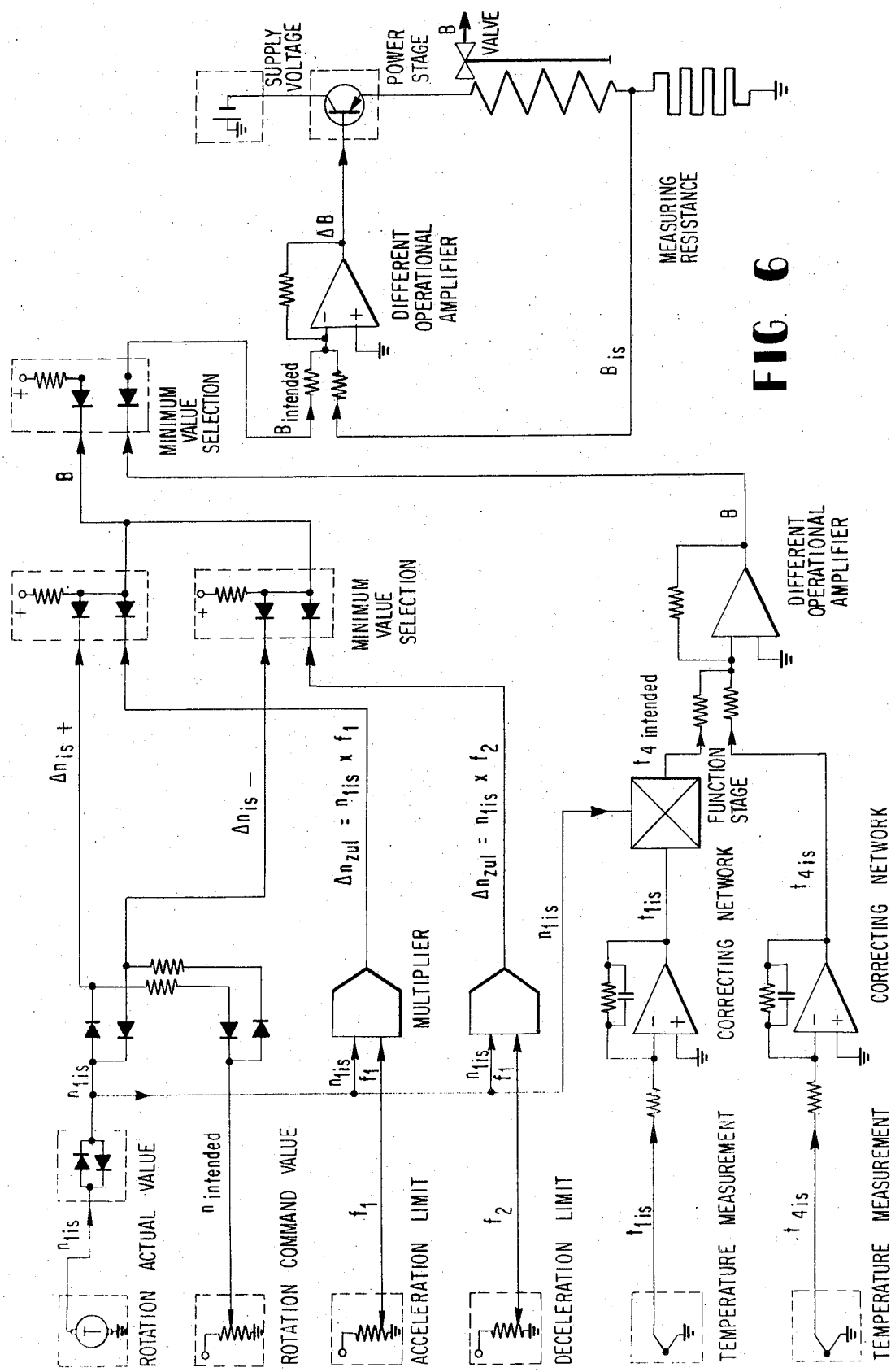
FIG. 6 is a view of a block diagram of a conventional control device integrated in a second control system shown in FIG. 4.

For the setting of the minimum fuel flow in dependence on the output signals of the control device 61' (FIG. 4), the end position of spool valve or control piston 82 is used which is shown as an example in FIG. 5, in which the control piston 82 abuts with collar 94, assisted by reset spring 96, against the end 95 of the sleeve 83 whereby the smallest possible minimum fuel quantity reaches the nozzle orifice 87 by way of fuel metering slots 84 and 85 at the places 97 and 98. In addition thereto, intermediate settings between maximum and minimum fuel quantity can be obtained with the fuel injection mechanism according to FIG. 5, which are adjusted in dependence on a pulse from the electrical or electronic control device 61' (FIG. 4), whereby such pulse modulation is produced in a conventional manner by the various operating magnitudes $n$, $t_4$, $t_1$ of the gas turbine engine which are stored in the control device 61' in a well-known, conventional manner. Though such electric or electronic devices 61' inclusive the logic elements and storage devices as well as the respective circuits thereof are known as such in the prior art and form no part of the present invention, a block diagram of the control device 61' is shown in FIG. 6 for the sake of clarity. The electrical regulating device for the regulation of the necessary quantities of the fuel is a fixed regulating system, in which a determined control current corresponds to a desired amount of fuel. On the rotational speed regulation circuit is superimposed (heterodyned) a temperature-regulating circuit in such a way that exceeding the command (nominal) value, the temperature-regulating circuit performs a primary function and controls the quantity of fuel. In order to limit the amount of acceleration and deceleration, the momentary deviation of rotation is measured according to sign (+and −) and value and is compared to either adjustable limiting value. The admissible deviation of rotation is determined thereby in a selector stage, whereby the deviation of rotation governs by means of a power stage with a differential operational amplifier the admissible quantity of fuel. In order to reduce disturbing values, there is provided a subordinate fuel regulating circuit. Since such control devices are conventional, a more detailed description thereof is dispensed with herein.

While I have shown and described several embodiments in accordance with the present invention, it is understood that the same is not limited thereto but is susceptible of numerous changes and modifications as known to those skilled in the art, and I therefore do not wish to be limited to the illustrated and described details but intend to cover all such changes and modifications as are encompassed by the scope of the appended claims.

I claim:

1. A gas turbine engine comprising compressor means, combustion chamber means, turbine means, fuel injection means for introducing fuel to the combustion chamber means, fuel metering means for varying the supply of fuel to said fuel injection means in response to variations in engine operating parameters, fuel supplying means for supplying fuel to said fuel metering means at a constant predetermined pressure, said metering means including metering slots and metering piston means for varying the openings in said slots, said metering means further including movable piston control means connected directly to said metering piston means for controlling the movement of said metering piston means, actuating means for effecting movement of said piston control means in response to variations in the engine operating parameters, and insulating means for operatively insulating said piston control means from the fuel supplying means such that the control of the metering means is independent of the fuel pressure supplied thereto.

2. A gas turbine engine according to claim 1, further comprising a common housing for both said fuel injection means and said fuel metering means, said fuel injection means and metering piston means and associated slots being in a first section of said housing, said piston control means being in a second section of said housing, and wherein said insulating means includes a partition wall for separating said first and second sections.

3. A gas turbine engine according to claim 2, characterized in that said first and second sections of the housing are detachably connected to one another.

4. A gas turbine engine according to claim 2, characterized in that said piston control means comprises electro-magnetic means having a magnet core fixedly mounted in said second section and a magnet coil mounted for movement with respect to said magnet core, said magnet coil being operatively attached for directly moving said metering piston means in response to electrical inputs corresponding to variations in the operating parameters of the engine.

5. A gas turbine engine according to claim 2, characterized in that said piston control means comprises a control piston movable in response to variations in pressure in said second section.

6. A gas turbine engine according to claim 2, characterized in that said piston control means comprises a control diaphragm movable in response to variations in pressure in said second section.

7. A gas turbine engine according to claim 5, characterized in that said second section is connected via adjustable throttle means with a compressor outlet and is also connected to a bleed valve means controlled by an engine speed governor.

8. A gas turbine engine according to claim 6, characterized in that said second section is connected via adjustable throttle means with a compressor outlet and is also connected to a bleed valve means controlled by an engine speed governor.

9. A gas turbine engine according to claim 2, characterized in that the metering slots are provided in an associated atomizer head which is contained in said first housing section and in that said metering piston means is directly connected with said piston control means.

10. A gas turbine engine according to claim 9, characterized in that said metering slots are arranged substantially tangentially in said atomizer head and in that said atomizer head is substantially cylindrical.

11. A gas turbine engine according to claim 9, characterized in that said metering piston means is detachably connected with said piston control means.

12. A gas turbine engine according to claim 9, characterized in that said metering piston means is non-detachably connected with said piston control means.

13. A gas turbine engine according to claim 1, characterized in that a means actuated as a function of the engine speed selectively opens or closes a bleed valve operatively connected with the fuel metering means.

14. A gas turbine engine according to claim 5, characterized in that the control piston is displaceable against the reset effect of a spring.

15. A gas turbine engine according to claim 5, characterized in that a means actuated as a function of the engine speed selectively opens or closes a bleed valve operatively connected with the second section.

16. A gas turbine engine according to claim 15, characterized in that the second housing section of the housing is separably connected with the first housing section.

17. A gas turbine engine according to claim 15, characterized in that the metering slots are provided in an associated atomizer head which is contained in said first housing section.

18. A gas turbine engine according to claim 15, characterized in that said metering piston means is detachably connected with said control piston.

19. A gas turbine engine according to claim 15, characterized in that said metering piston means is non-detachably connected with said control piston.

20. A gas turbine engine according to claim 15, characterized in that said metering slots are arranged substantially tangentially in said atomizer head and in that said atomizer head is substantially cylindrical.

21. A fuel injection and metering arrangement for use on gas turbine engines of the type having compressor means, combustion chamber means, turbine means and constant pressure fuel supply means for supplying fuel at a constant predetermined pressure; said arrangement comprising fuel injection means for injecting fuel into the combustion chamber, metering means for varying the amount of fuel going to said fuel injection means in response to variations in engine operating parameters, said metering means including metering slots adjacent the injection means and metering piston means for varying the openings in said slots, said metering means further including movable piston control means connected directly to said metering piston means for controlling the movement of said metering piston means, actuating means for effecting movement of said piston control means in response to variations in the engine operating parameters, and insulating means for operatively insulating said piston control means from the fuel supply means such that the control of the metering means is independent of the fuel pressure supplied thereto.

22. An arrangement according to claim 21, further comprising a common housing for both said fuel injection means and said fuel metering means, said fuel injection means and metering piston means and associated slots being in a first section of said housing, said piston control means being in a second section of said housing, and wherein said insulating means includes a partition wall for separating said first and second sections.

23. An arrangement according to claim 22, characterized in that said piston control means comprises electro-magnetic means having a magnet core fixedly mounted in said second section and a magnet coil mounted for movement with respect to said magnet core, said magnet coil being operatively attached for directly moving said metering piston means in response to electrical inputs corresponding to variations in the operating parameters of the engine.

24. An arrangement according to claim 22, characterized in that said piston control means comprises a control piston movable in response to variations in pressure in said second section.

25. An arrangement according to claim 22, characterized in that said piston control means comprises a control diaphragm movable in response to variations in pressure in said second section.

26. An arrangement according to claim 24, characterized in that said second section is connected via adjustable throttle means with a compressor outlet and is also connected to a bleed valve means controlled by an engine speed governor.

27. An arrangement according to claim 25, characterized in that said second section is connected via adjustable throttle means with a compressor outlet and is also connected to a bleed valve means controlled by an engine speed governor.

* * * * *